United States Patent
Seo et al.

(10) Patent No.: US 7,200,653 B2
(45) Date of Patent: Apr. 3, 2007

(54) DATA BASE ACCESS METHOD AND SYSTEM IN MANAGEMENT INFORMATION BASE OF NETWORK MANAGEMENT PROTOCOL

(75) Inventors: Kwang-Tae Seo, Seoul (KR); Hyo-Shin Shin, Songnam-shi (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 688 days.

(21) Appl. No.: 10/294,705

(22) Filed: Nov. 15, 2002

(65) Prior Publication Data

US 2003/0110261 A1 Jun. 12, 2003

(30) Foreign Application Priority Data

Dec. 12, 2001 (KR) ............................... 2001-78682

(51) Int. Cl.
*G06F 15/173* (2006.01)
*G06F 15/16* (2006.01)
*G06F 7/00* (2006.01)

(52) U.S. Cl. ...................... 709/223; 709/217; 707/101; 707/102; 707/103; 707/104.1

(58) Field of Classification Search ................ 709/217, 709/223; 707/100–104.1
See application file for complete search history.

(56) References Cited

U.S. PATENT DOCUMENTS 6,052,724 A    4/2000   Willie et al.

(Continued)

FOREIGN PATENT DOCUMENTS

JP         2001-222486         8/2001

(Continued)

OTHER PUBLICATIONS

Japanese Office action for Japanese Patent Application No. 2002-352273, issued on Feb. 14, 2006.

(Continued)

*Primary Examiner*—Nathan J. Flynn
*Assistant Examiner*—Joshua Joo
(74) *Attorney, Agent, or Firm*—Robert E. Bushnell, Esq.

(57) ABSTRACT

Disclosed is a data base access method and system that can easily access a data base (DB) in a management information base (MIB) of a simple network management protocol (SNMP) or a common management information protocol (CMIP). The method includes making contents of the MIB into an MBean class where members of m_Attrs, m_AttrName, and m_AttrType including information of the MIB and member functions for accessing these members, and members of m_DBJob and m_ConditionClause for a data base (DB) work and member functions for accessing these members exist, extracting an MIB-based class by compiling the MBean class, inputting an MIB-related instruction to use the extracted MIB-based class, performing a corresponding operation such as a data readout from the MIB if the instruction does not refer to a DB operation, loading the extracted MIB-based class and a smart view DB class SvDB including common information required for a DB access if the instruction refers to the DB operation, and accessing the DB by obtaining a DB name and instruction name and type from the MIB-based class. According to the method, the DB can be easily accessed without changing a DB API even if the MIB is changed.

12 Claims, 7 Drawing Sheets

U.S. PATENT DOCUMENTS

| | | | |
|---|---|---|---|
| 6,484,175 B1 * | 11/2002 | Stewart | 707/10 |
| 6,842,781 B1 * | 1/2005 | Lavian et al. | 709/223 |
| 2003/0135648 A1 * | 7/2003 | Porter | 709/246 |

FOREIGN PATENT DOCUMENTS

| | | |
|---|---|---|
| WO | WO 00/77686 | 12/2000 |

OTHER PUBLICATIONS

Hosokawa, *"Integrating a Large-Scale Legacy System by Using EJP Component Technology"*, Monthly Magazine Solution IT, No. 153 vol. 12, pp. 84-88, Dec. 1, 2001.

* cited by examiner

DATA BASE ACCESS METHOD AND SYSTEM IN MANAGEMENT INFORMATION BASE OF NETWORK MANAGEMENT PROTOCOL

CLAIM OF PRIORITY

This application claims priority under 35 U.S.C. §119 to my application entitled "Data base access method and system in management information base of network management protocol" filed in the Korean Industrial Property Office on Dec. 12, 2001 and assigned Serial No. 2001-78682, the contents of which are hereby incorporated by reference.

BACKGROUND OF THE INVENTION

1. Field of the Invention

The present invention relates to a data base access method in a management information base (MIB) of a simple network management protocol (SNMP) or a common management information protocol (CMIP). In particular, the present invention relates to a data base access method and system in a management information base of a network management protocol that enables an easy access of the data base without changing the application programming interface (API) even if the MIB is changed by designing classes so that they use the AIP of a single data base in accessing the data base of the MIB.

2. Description of the Related Art

Generally, the MIB is widely used for storing information required for the network management in the SNMP or CMIP. Detailed structure and function of the MIB are described at pages 200–220 of "PC TCP/IP" published by "KYOBO Book Center" in Korea. Also, the relationship between the management information base (MIB) and the simple network management protocol (SNMP) is disclosed in Korean Patent Laid-open No. 1999-49833. In a program based on the MIB, separately defined C-language structure and java class are used to express defined information of the MIB. The detailed structure and function of an MIB and an API are described at pages 200–220 and 305–316 of "PC TCP/IP" published by "KYOBO Book Center", and thus the detailed explanation thereof will be omitted. U.S. Pat. No. 6,052,724 to Willie et al. discloses that II the API performs a proper modulation to match the interfacing when it is provided in a specified implemented data module.

SUMMARY OF THE INVENTION

It is therefore an object of the present invention to provide a method and system for accessing a data base in SNMP or CMIP without altering the data base API.

It is further an object of the present invention to provide a method and a system for accessing a data base in SNMP or CMIP even when the MIB is changed.

It is yet another object of the present invention is to provide a database access method and system that can easily access the data base (DB) without changing a DB API even if the MIB is changed in the DB common to all the MIBs, by applying the API of the single DB in designing the MIB-based class.

These and other objects can be achieved by a data base access method in a management information base (MIB) of a network management protocol, including making contents of an MIB into an MBean class where members of m_Attrs, m_AttrName, and m_AttrType including information of the MIB and member functions for accessing these members, and members of m_DBJob and m_ConditionClause for a data base (DB) work and member functions for accessing these members exist, extracting an MIB-based class by compiling the MBean class made at the first step, inputting an MIB-related instruction to use the extracted MIB-based class (i.e., a DB table name, column name, and column type), performing a corresponding operation such as a data readout from the MIB if the instruction inputted at the third step does not refer to a DB operation, loading the extracted MIB-based class and a smart view DB class SvDB including common information required for a DB access when the instruction refers to the DB operation in the performing step, and accessing the DB by obtaining a DB name and instruction name and type from the MIB-based class.

Thus, according to the present invention, the contents of the MIB are first made into the MBean class where the members of m_Attrs, m_AttrName, and m_AttrType that include the MIB information and the member functions that access these members, and the members of m_DBJob and m_ConditionClause for the data base work and the member functions that access these members exist. Then, the MIB-based class is extracted by compiling the MBean class. In order to use the extracted MIB-based class (i.e., DB table name, column name, and column type), the MIB-related instruction is inputted. When the inputted instruction does not refer to the DB operation, the corresponding operation such as the data readout from the MIB is performed. When the instruction refers to the DB operation, the extracted MIB-based class is loaded, and the smart view DB class SvDB that includes common information required for the DB access is loaded. Then, the DB name and the instruction name and type are obtained from the MIB-based class, and the DB is accessed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
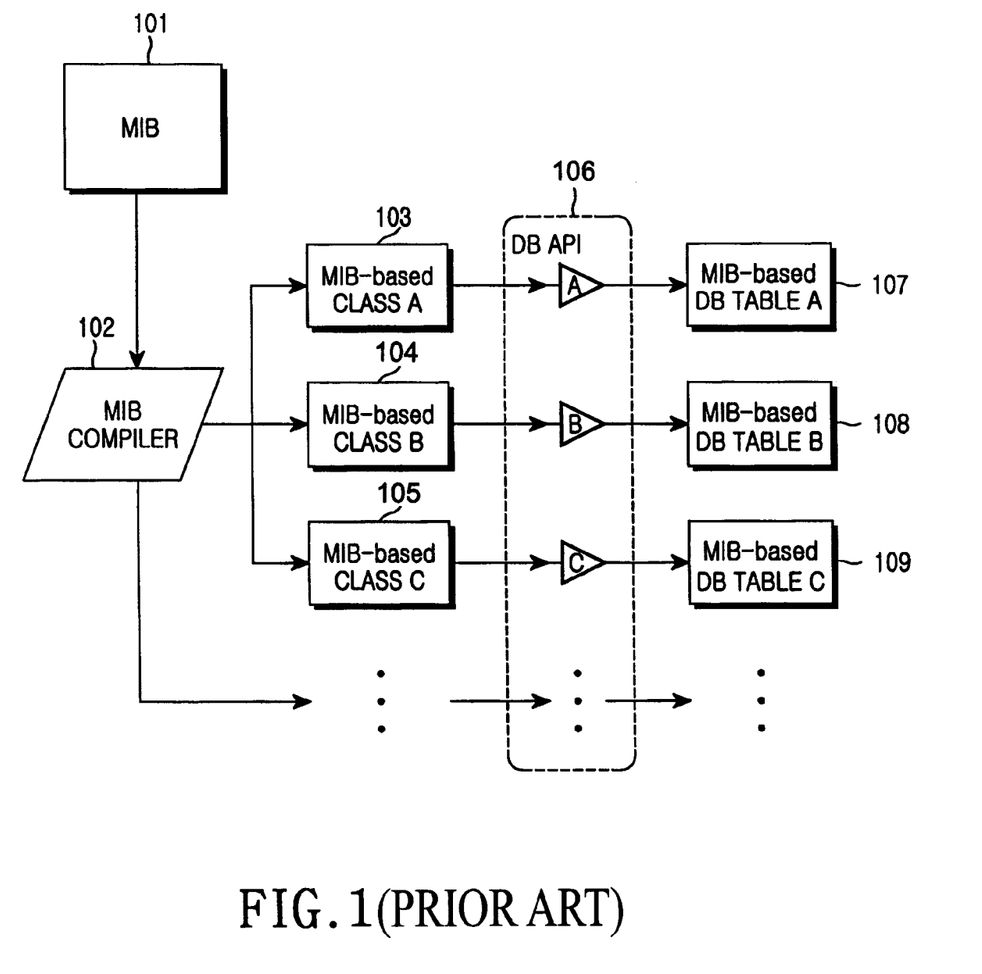
FIG. 1 is a block diagram of a data base access system in a management information base of a network management protocol.

Turning to FIG. 1, FIG. 1 illustrates a management information base (MIB) 101 in a system using simple network management protocol (SNMP). In FIG. 1, it is common that the structure or the class is automatically generated using an output of the MIB 101 through an MIB compiler 102. However, even in case of accessing the data base using such structures or classes which have been automatically generated, MIB-based data bases (DBs) 107 to 109 extracted from the MIB 101 are accessed by separately defining an API 106 of the DBs corresponding to the respective structure or class. This method imposes a great burden since whenever the definition of the MIB 101 is changed, the corresponding data base (DB) APIs 106 should be changed one by one.

Figure 2:
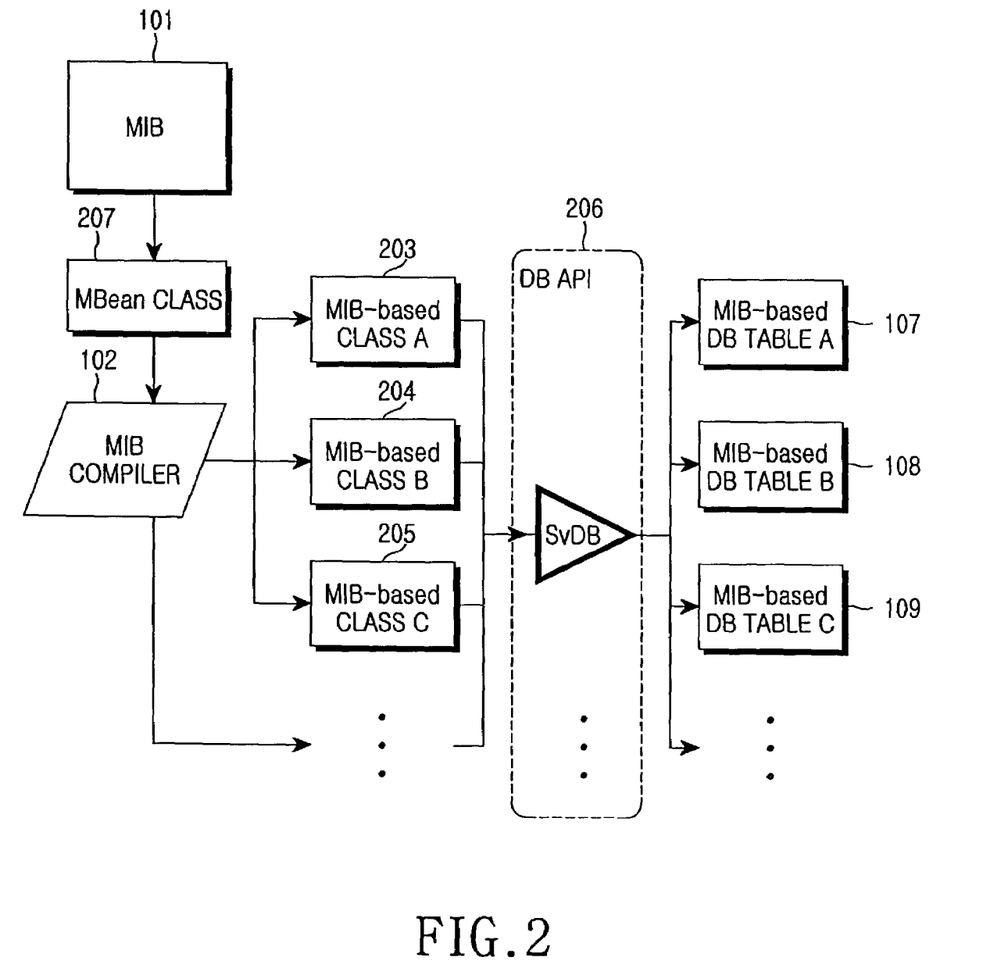
FIG. 2 is a block diagram of a database access system that applies an MIB-based class and a DB API common to the MIB according to an embodiment of the present invention.
Figure 5A:
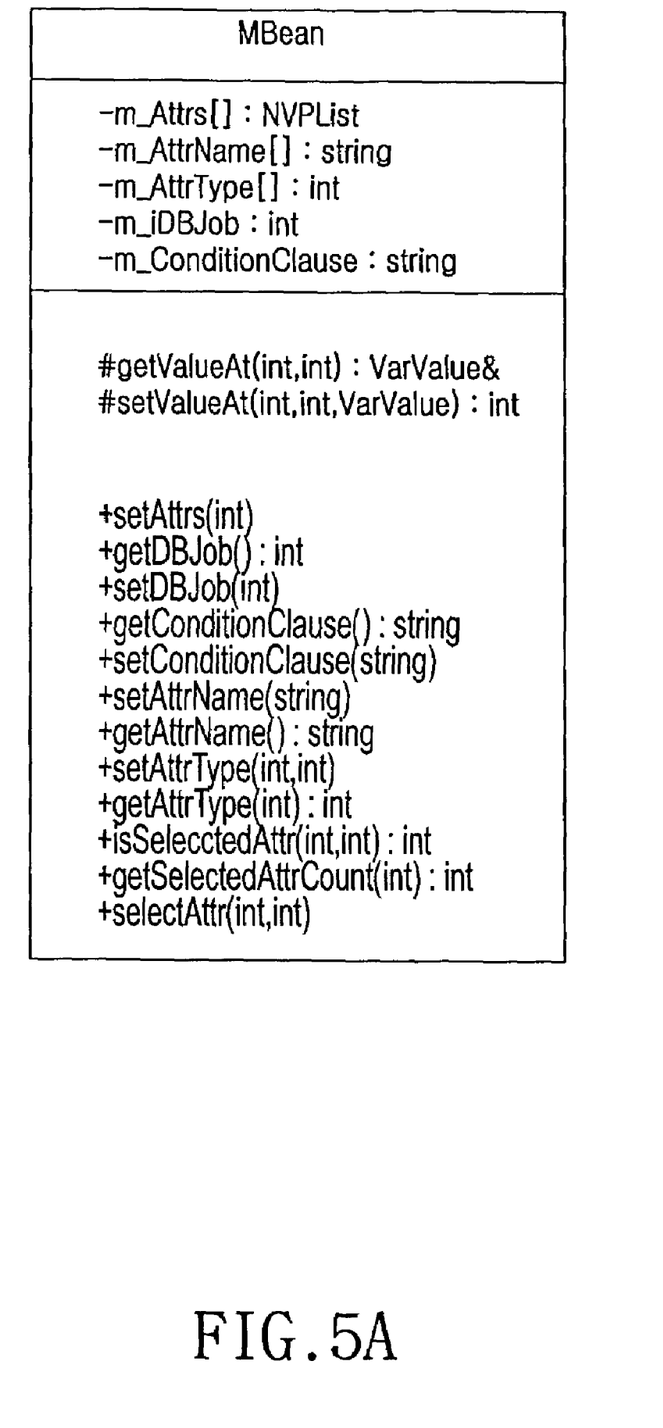
FIGS. 5A and 5B are views explaining the generation of an MBean class where members of m_Attrs, m_AttrName, and m_AttrType that include information of the MIB and member functions that access these members exist and a smart view DB (SvDB) class including common information required for the DB access according to an embodiment of the present invention.

FIG. 2 is a block diagram of a data base access system that applies an MIB-based class and a DB API common to the MIB according to an embodiment of the present invention. An MBean class 207, as shown in FIG. 5A to be explained later, extracts members of m_Attrs, m_AttrName, and m_AttrType, that include information of the MIB, and member functions that access these members. The MBean class also includes members of m_DBJob and m_ConditionClause for DB work and member functions that access these members. An MIB compiler 102 extracts the DB information including the MIB by compiling the MBean class 207.

Figure 6:
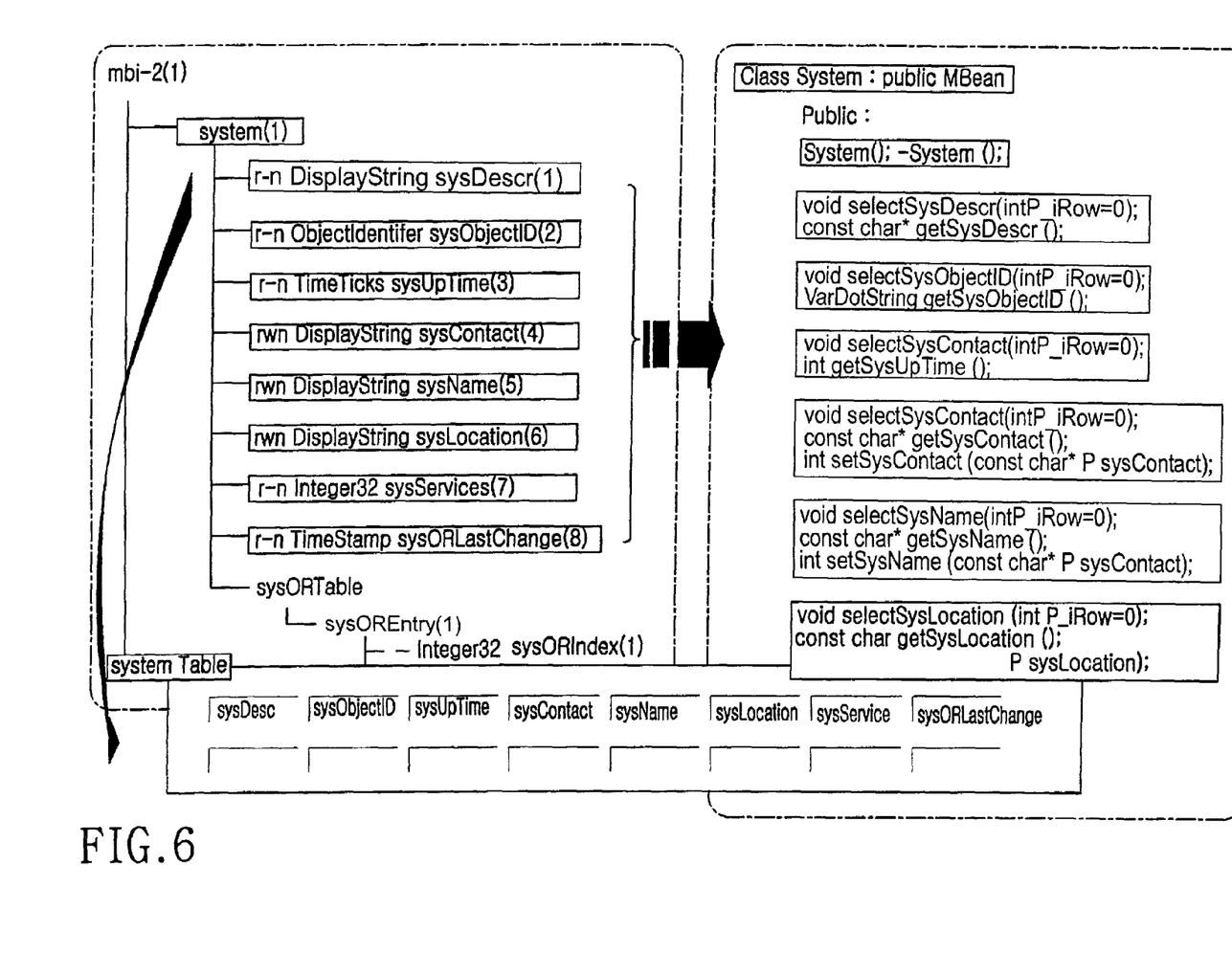
FIG. 6 is a view explaining how lower attributes of an MIB-2 system succeed an MBean class and are defined as a system class.

The MIB-based class A~C 203 to 205 are constructed by succession of the MBean class to all classes derived from the MIB 101 in the same manner as the system class illustrated in FIG. 6, which shows how the lower attributes of an MIB-2 system succeed the MBean class 207 and are defined as the system class.

Figure 5B:
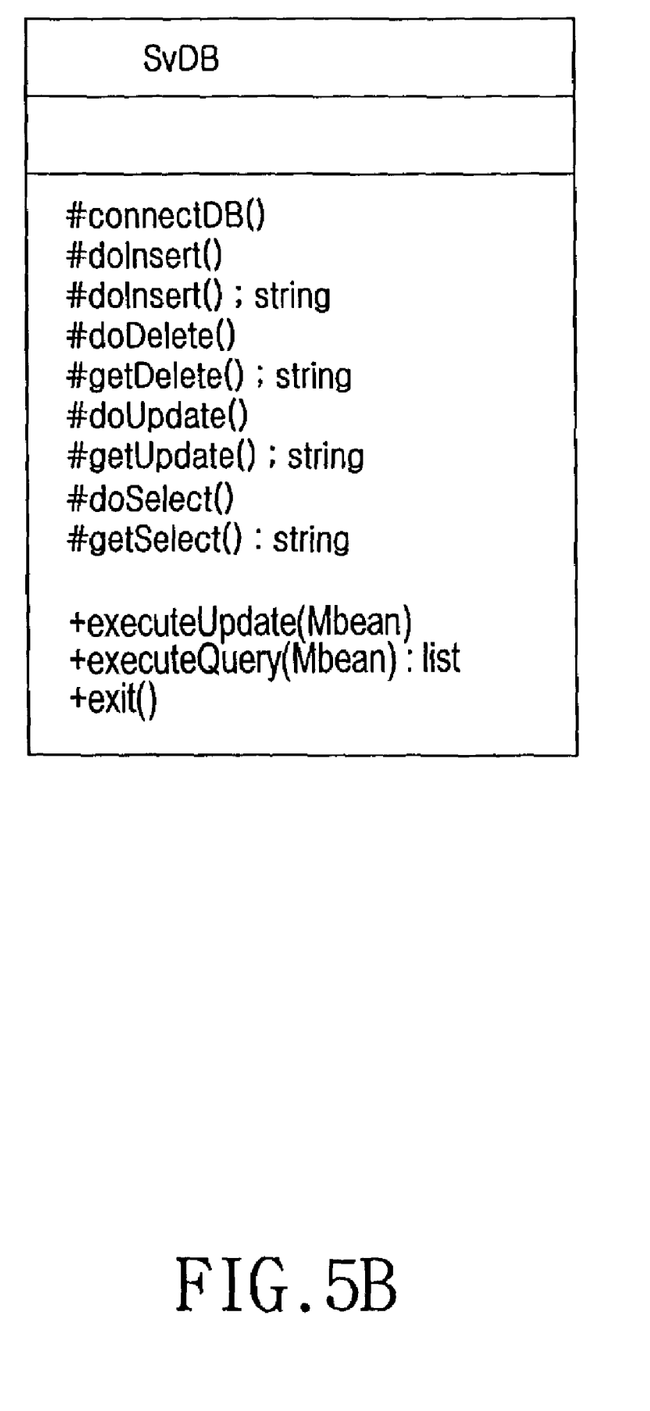

A smart view DB (SvDB) class 206 has the DB API function, and includes member functions for accessing the DB as the class that provides the common DB API for accessing the DB. The SvDB class 206 has the structure as illustrated in FIG. 5B. Thus, it generates the MIB-based DB information extract values. MIB-based DB tables 107, 108, and 109 have the same name as those defined in the MIB as illustrated in FIG. 6. When one MIB is given as described above, the MIB-based DB information extract values, i.e., MIB-based class A~C 203 to 205, which succeeds to the MBean class 207 according to the attributes existing in the MIB, are defined, and for each of the MIB-based class A~C 203 to 205 exists an MIB-based DB table having the same name and type. They are automatically extracted in a predefined format using the MIB compiler 102. At this time, it is not required to change one by one the respective DB APIs 106 when the definition of the MIB 101 is changed. Since the MIB-based DB table having the same name and type exists for each of the MIB-based class A~C 203 to 205, the DB work can be performed using the SvDB class when the DB operation is needed using one common DB API 206 for accessing the DB.

Figure 3:
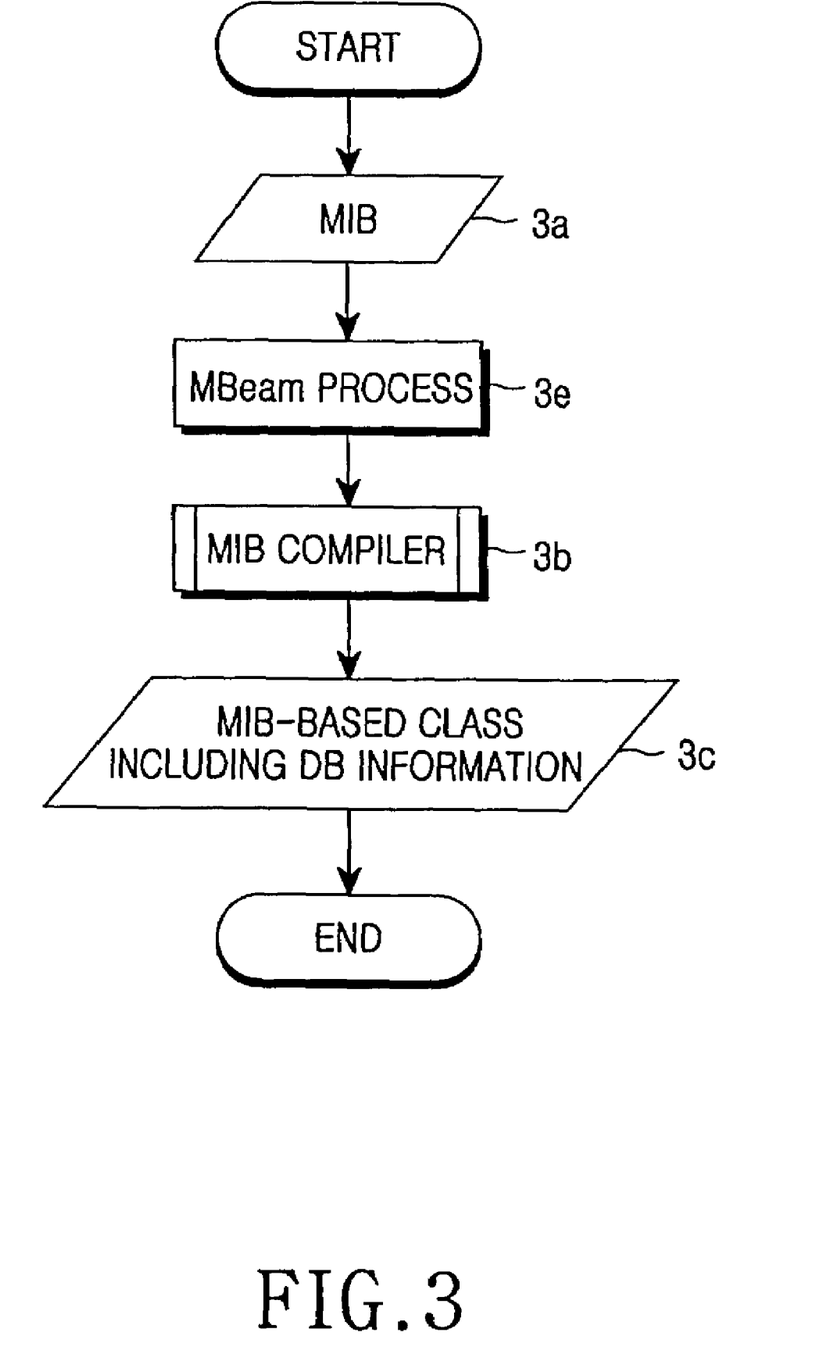
FIG. 3 is a flowchart explaining the extraction of the MIB-based class according to an embodiment of the present invention.

FIG. 3 is a flowchart explaining the extraction of the MIB-based class according to an embodiment of the present invention. Referring to FIG. 3, the contents of the MIB are first made into the MBean class where the members of m_Attrs, m_AttrName, and m_AttrType that include the MIB information and the member functions that access these members, and the members of m_DBJob and m_ConditionClause for the data base work and the member functions that access these members exist. Then, the MIB-based class is extracted by compiling the MBean class made as above.

Figure 4:
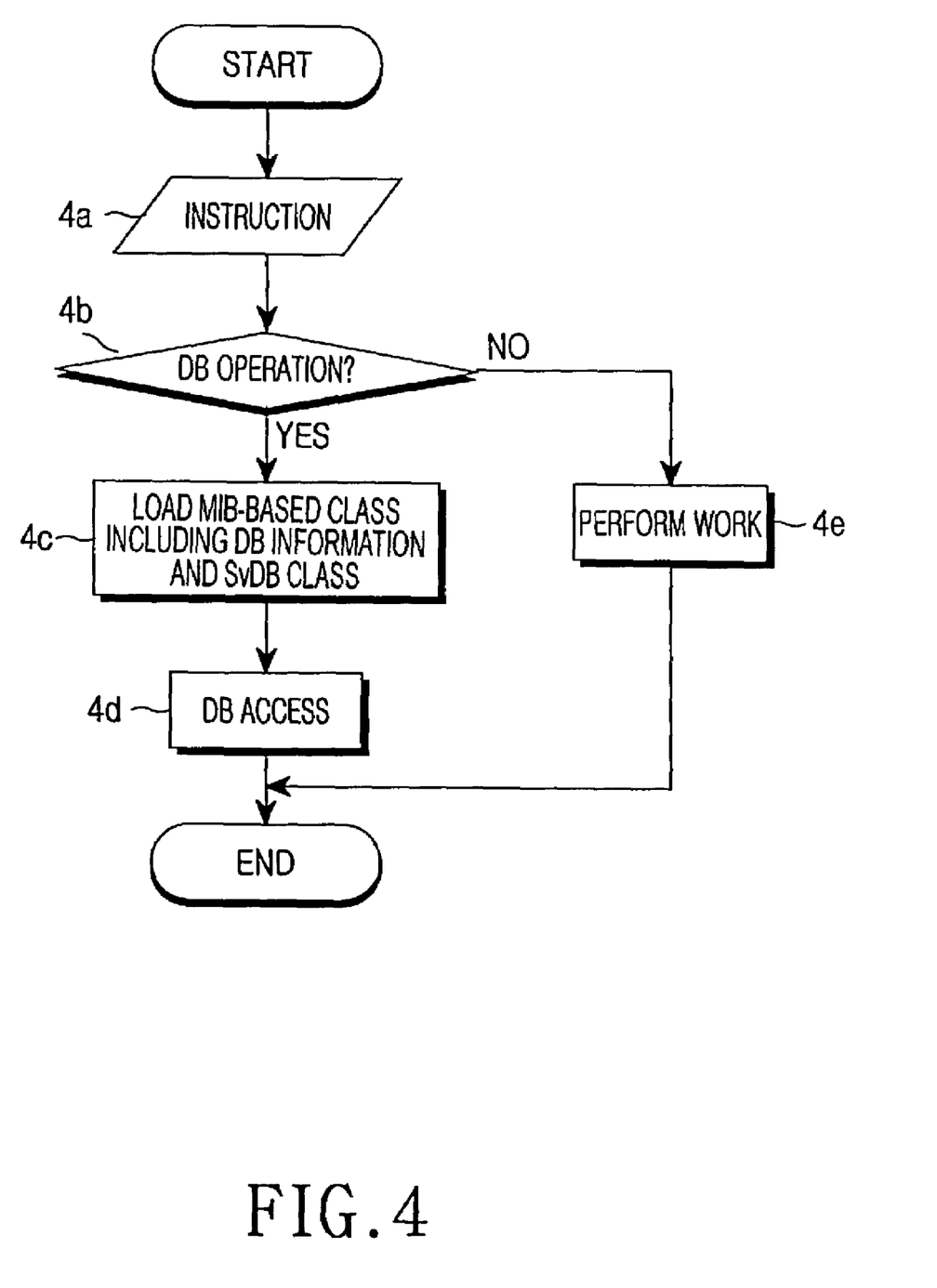
FIG. 4 is a flowchart explaining the DB work using an SvDB class when the DB operation is required using a common DB API for accessing the DB according to an embodiment of the present invention.

FIG. 4 is a flowchart explaining the DB work using the SvDB class when the DB operation is required using a common DB API for accessing the DB according to an embodiment of the present invention. Referring to FIG. 4, in order to use the extracted MIB-based class (i.e., DB table name, column name, and column type), the MIB-related instruction is inputted. If the inputted instruction does not refer to the DB operation, the corresponding operation such as the data readout from the MIB is performed. If the instruction refers to the DB operation, the extracted MIB-based class is loaded, and the smart view DB class SvDB that includes common information required for the DB access is loaded. Then, the DB name and the instruction name and type are obtained from the MIB-based class, and the DB is accessed.

FIGS. 5A and 5B are views explaining the generation of the MBean class where the members of m_Attrs, m_AttrName, and m_AttrType that include information of the MIB and member functions that access these members exist and a smart view DB class SvDB including common information required for the DB access according to an embodiment of the present invention.

FIG. 6 is a view explaining how the lower attributes of an MIB-2 system succeed an MBean class and are defined as a system class. The operation of the system according to the embodiment of the present invention will now be explained with reference to FIGS. 2 through 6. At a step 3a, the output of the MIB 101 is received in the MBean class 207 as shown in FIG. 5A. At a step 3e, the MBean class 207 generates the members of m_Attrs, m_AttrName, and m_AttrType that include the MIB information and the member functions that access these members, and the members of m_DBJob and m_ConditionClause for the data base work and the member functions that access these members. Then, as shown in FIG. 3, the MIB-based class is generated at a step 3b using the MIB compiler 102 of the step 3b. At this time, the MIB-based class includes the DB information (i.e., DB table name, column name, column type, etc.). Also, as shown in FIG. 6, the DB instruction required in the MIB-based class that succeeds to the MBean class at the step 4a of FIG. 4 is determined using the setDBJob member function. That is, it is checked at step 4a whether the input instruction refers to the DB operation, and if not, the corresponding operation is performed using the MIB-based class at a step 4e. If the instruction refers to the DB operation, necessary attributes are determined at the step 4c by loading the MIB-based class including the DB information and the SvDB class according to the DB instruction determined at the step 4a.

Specifically, in case of an insert instruction, all the attributes necessary for insertion into the DB are determined using setXXX member functions. In case of a delete instruction, the necessary condition clause is determined in m_ConditionClause for deletion from the DB. In case of an update instruction, values of all the attributes necessary for update of the DB are determined using the setXXX member functions. If necessary, the m_ConditionClause is also determined. In case of the insert, delete, or update DB instruction as described above, an executeUpdate member function of the SvDB is called as shown in FIG. 5B, and in case of a select instruction, an executeQuery member function of the SvDB is called. The executeUpdate function of the SvDB obtains the name, type, and value of the selected attribute of the transferred MIB-based class using functions of getName, getAttriName, getAttriType, and getValueAt of the MBean class of FIG. 6. Also, in case that the condition clause is selected, the value of the m_ConditionClause is also obtained. By combining the values obtained as above, the clause required for the DB is completed. The SvDB class performs the DB instruction using the completed DB clause, and returns the result of performing. The executeQuery function of the SvDB obtains the name, type, and value of the selected attribute of the transferred MIB-based class using the functions of getName, getAttriName, getAttriType, and getValueAt of the MBean class. Also, in case that the condition clause is selected, the value of the m_ConditionClause is also obtained. By combining the values obtained as above, the clause required for the DB is completed. The SvDB class performs the DB instruction using the completed DB clause, and returns the result of performing by storing the result in a list.

As described above, the data base access method and system according to the present invention has the advantages in that it can easily access the data base DB by applying the API of the single data base (DB) in designing the MIB-based class without changing the data base API even if the MIB is changed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data base access method, comprising:
providing a management (MIB) of a simple network management protocol (SNMP) or a common management information protocol (CMIP);
generating an MIB-related instruction to use the MIB-based class;
performing the instruction using the MIB-based class when the instruction does not refer to a data base operation;
loading the MIB-based class for the instruction and a smart view DB class comprising common information required for the data base access when the instruction refers to the data base operation; and
accessing a data base by obtaining a table name and column name and type of the data base stored in the MIB-based class, wherein the generating produces a plurality of MIB-based classes corresponding to different MIB-based data bases, each of said data bases and each of said MIB-based classes interfacing with said smart view DB class comprising the common information when the instruction refers to the data base operation, the smart view DB class being an only DB application programming interface DB, the method occurring upon each change of the contents of the MIB.

2. A data base access method, comprising:
providing a management information base (MIB) of a simple network management protocol (SNMP) or a common management information protocol (CMIP);
making contents of the MIB into an Mbean class where members of m—Attrs m—AttrName, and m—AttrType comprising information of the MIB and member functions accessing said m—Attrs, m—AttrName, and m—AttrType members, and members of m—DBJob and m—ConditionClause for a data base work and member functions for accessing said m—DBJob and m—ConditionClause members exist;
extracting an MIB-based class by compiling the Mbean class made in the making contents step;
inputting an MIB-related instruction to use the extracted MIB-based class, the MIB-based class being selected from the group consisting of a database (DR) table name, column name, and column type;
performing the instruction when the instruction inputted does not refer to a DB operation;
loading the extracted MIR-based class and a smart view DB class (SvDR) comprising common information required for a DB access when the instruction refers to the DR operation in the performing step; and
accessing the DB by obtaining a DR name and instruction name and type from the MIR-based class, wherein the extracting produces a plurality of MIB-based classes corresponding to different MIB-based data bases, each of said data bases and each of said MIB-based classes interfacing with said smart view DB class comprising the common information when the instruction refers to the data base operation, the smart view DB class being an only DB application programming interface DB, the method occurring upon each change of the contents of the MIB.

3. The method of claim 2, said method being absent alteration of the SvDB.

4. A data base access system of a simple network management protocol (SNMP) or a common management information protocol (CMIP) provided with the system comprising:
a management information base (MIB);
a plurality of MIB-based classes;
a plurality of MIB-based data base (DB) tables corresponding to respective ones of said plurality of MIB-based classes,
an Mbean class adapted to make contents of the MIB into the Mbean class where members of m—Attrs m—AttrName, and m—AttrType including information of the MIB and member functions for accessing said m—Attrs m—AttrName and m—AttrType members, and members of m—DBJob and m—ConditionClause for a DB work and member functions for accessing said m—DBJob and m—ConditionClause members exist;
an MIB compiler adapted to extract DB information, the DB information being selected from the group consisting of a DB table name, column name, and column type, including the MIB from the MIB-based classes by the MIB compiler compiling the Mbean class; and
a data base application programming interface (DB-API) adapted to access the DB by loading the extracted DB information comprising the MIB and a smart view DB class SvDB comprising common information required for a DB access when an inputted execution instruction refers to a DB operation, and obtaining a DB name and instruction name and type from the DB information including the MIB, wherein the MIB compiler is adapted to produce a plurality of MIB-based classes corresponding to different MIB-based data bases, each of said data bases and each of MIB-based classes interfacing with said smart view DB class comprising the common information when the instruction refers to the data base operation, the smart view DB class being an only DB application programming interface DB, the system being adapted to produce the plurality of MIB-based classes upon each change of the contents of the MIB.

5. The system of claim 4, said MIB compiler being disposed between said MIB and each one of said plurality of MIB-based classes.

6. The system of claim 5, said DB-API being disposed between said plurality of MIB-based classes and said plurality of MIB-based data base tables.

7. The method of claim 1, wherein the smart view DB class is not modified upon modification of the contents of the MIB.

8. The method of claim 7, the generated MIB-based class being designed in view of the smart view DB class.

9. The method of claim 8, the smart view DB class being an data base application programming interface.

10. The method of claim 1, wherein the generating produces a plurality of MIB-based classes, each of said plurality of MIB-based classes being adapted to interwork with the smart view DB that comprises the common information when the instruction refers to the data base operation.

11. The system of claim 6, the DB-API comprising only one data base, said only one data base interfacing with each of said plurality of MIB-based classes when the instruction refers to the data base operation.

12. The system of claim 11, each of the MIB-based classes being designed in view of said only one data base in said DB-API that does not change with changes to said MIB.

* * * * *